July 17, 1928.  1,677,231
E. W. DUNBAR ET AL
MACHINE FOR MAKING STRAPS
Filed Dec. 31, 1924    2 Sheets-Sheet 1
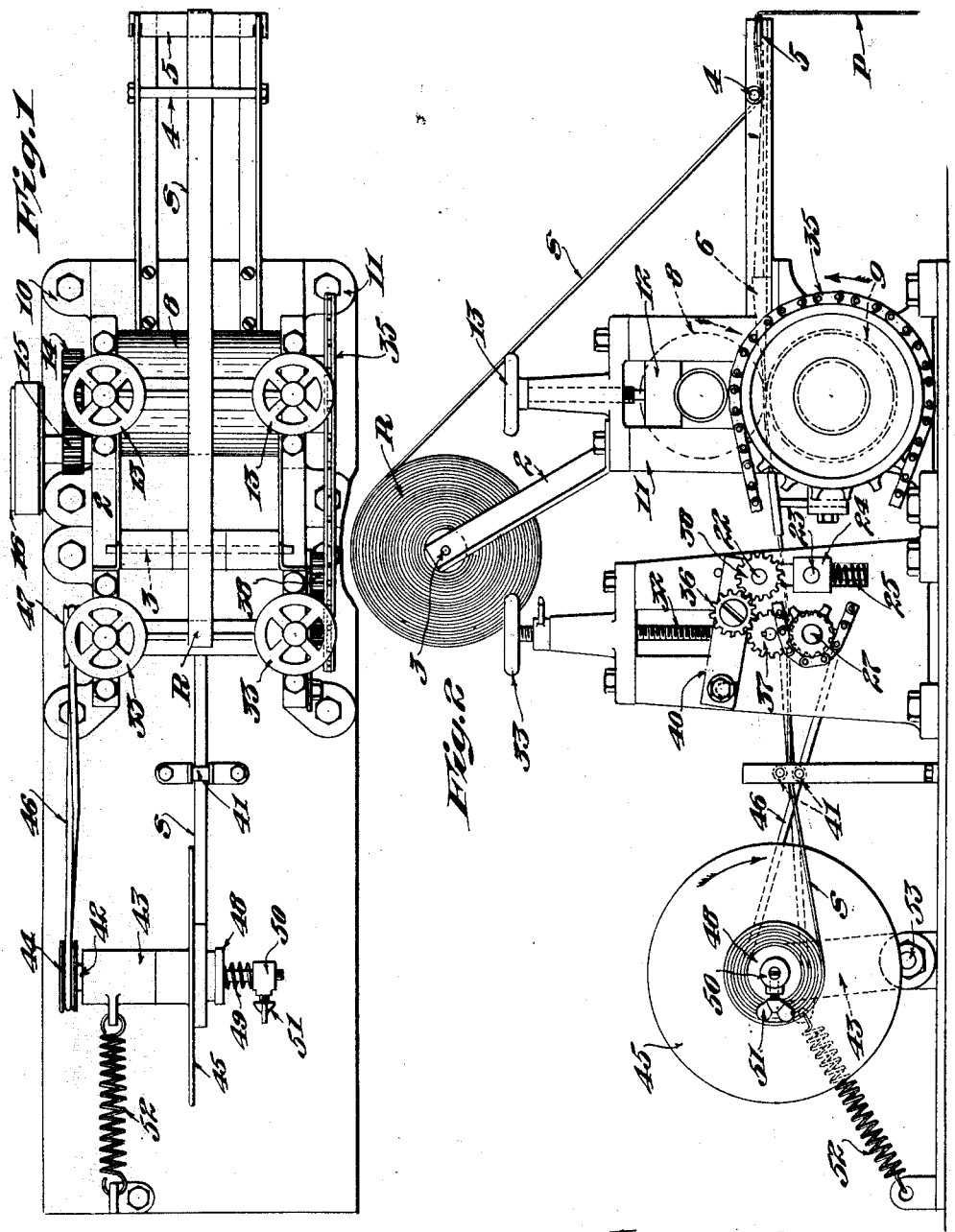

July 17, 1928. 1,677,231
E. W. DUNBAR ET AL
MACHINE FOR MAKING STRAPS
Filed Dec. 31, 1924 2 Sheets-Sheet 2
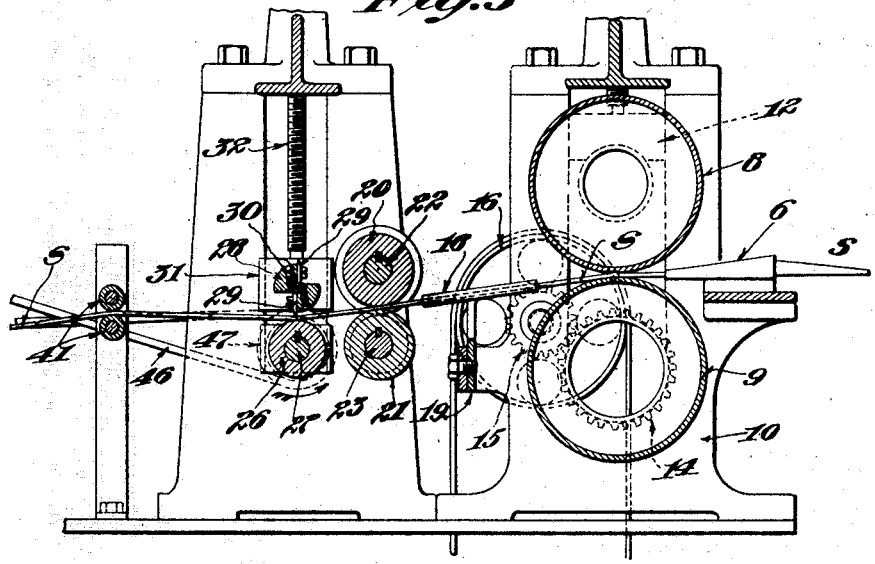
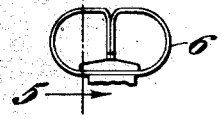
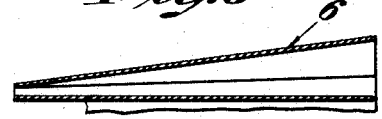
Inventors
Ernest W. Dunbar
and
Edmund J. Dempsey
by J. H. McCurdy
their Attorney Patented July 17, 1928.

1,677,231

UNITED STATES PATENT OFFICE.

ERNEST W. DUNBAR, OF HUDSON, AND EDMUND J. DEMPSEY, OF WEST MEDFORD, MASSACHUSETTS, ASSIGNORS TO CAMBRIDGE RUBBER COMPANY, OF CAMBRIDGE, MASSACHUSETTS, A CORPORATION OF MASSACHUSETTS.

MACHINE FOR MAKING STRAPS.

Application filed December 31, 1924. Serial No. 759,121.

In the manufacture of rubber footwear, such, for example, as Arctics, gaiters, lumbermen's rubbers, and the like, it is customary to secure the buckles to the boot or shoe by means of straps or stays. That is, a strap is passed through the loop in the buckle or clasp, and the ends of the strap are then brought together and anchored between adjacent plies of the upper of the shoe. Subsequently the strap is firmly secured in this position by the vulcanizing operation.

The present invention relates to the manufacture of straps suitable for this and other purposes. It is the general object of the invention to effect economies in the manufacture of such straps.

It is the chief object of the invention to devise a machine for use in making such straps which will perform automatically many of the operations required in their manufacture.

The nature of the invention will be readily understood from the following description when read in connection with the accompanying drawings, and the novel features will be particularly pointed out in the appended claims.

In the drawings:

Figure 1 is a plan view of a machine embodying the present invention;

Fig. 2 is a side view of the machine shown in Fig. 1;

Fig. 3 is a vertical, longitudinal, cross-sectional view of part of the machine shown in Figs. 1 and 2, the plane of section being taken substantially along the line of travel of the material through the machine;

Fig. 4 is an end view of a folding chute which forms one element of the machine shown in Figs. 1, 2 and 3;

Fig. 5 is a cross sectional view on the line 5—5, Fig. 4;

Fig. 6 is a side elevation showing certain steps in the folding operation;

Fig. 7 is a cross sectional view of the strip of material which is fed to the machine;

Fig. 8 is a cross sectional view showing said strip after the paper covering has been removed;

Fig. 9 is a cross sectional view of the folded strip; and

Figs. 10 and 11 are perspective views of a strap made in accordance with this invention.

Usually straps of the character above mentioned are made of fabric which is frictioned on one side so that it is very tacky or sticky and has a rubber coating on its opposite side. It is contemplated that when the rubberized fabric comes to this machine it will have been coated, cut into strips and the strips wound up into the form of rolls as shown at R, (Fig. 2). In order to keep the adjacent turns of the roll from adhering to each other, they are separated by a strip of paper. Fig. 7 shows a cross sectional view of the strip of material at this time, the frictioned fabric being designated at F, the rubber coating at A, and the paper strip at P.

The machine shown comprises a stand 2 loosely supporting a rod 3 on which the roll R of strap stock is supported. As the strip S of material is unwound from the roll R, it is first passed under a small roll 4 and then over a relatively thin blade 5 around which it is turned sharply, as best shown in Fig. 2, for the purpose of stripping off the paper cover P. The paper simply peels off as the strip travels around the blunt edge of the blade 5. The rubber coated strip then passes under the blade and enters a folding chute 6.

The chute consists of a tapered metal tube, as best shown in Figs. 4 and 5, the construction being such, as will be evident from the drawings, that it first bends the rubber coated strip S into a U shape, turning the margins upwardly, and then folds these upturned margins over upon the central portion of the strip, bringing the edges together and abutting them against each other at the middle of the strip, as best shown in Figs. 9 and 10. The frictioned or tacky surface is on the inside of the folded strip so that the folded margins adhere readily to the central portion of the strip.

These molds are next pressed firmly together by passing the strip between upper and lower pressure rolls 8 and 9. The lower roll 9 includes journals which run in bearings formed in the frame pieces 10 and 11, while the upper roll is held in contact with the lower roll, or with the strip of material which passes between the rolls, by adjustable bearing blocks, one of which is shown in Fig. 3 at 12, each block having a screw bearing thereon and adjustable by means of a hand wheel 13 (Figs. 1 and 2). The lower roll carries a gear 14 (Figs. 1 and 3) which is driven by a pinion 15 secured to a driving shaft which carries a pulley 16 by means of which the machine may be belted to any convenient source of power.

The folded strip next travels through a short guide chute 18 which is bolted to a flange or web 19 that connects the frame pieces 10 and 11, and it then passes directly between upper and lower feed rolls 20 and 21 (Fig. 3), these rolls having peripheral grooves to hold the strip against lateral displacement. The upper roll 20 is carried by a shaft 22 which rotates in fixed bearings, while the lower roll 21 is mounted on a shaft 23 which is supported at its opposite ends in bearing blocks, one of which is shown at 24 (Fig. 2). These blocks are slidable in vertical guide ways formed in the frame of the machine and they are supported by springs, such as that shown at 25, which hold the lower roll 21 yieldingly in contact with the upper roll 20. The feed rolls draw the strip of material through the machine and, together with the feeding action exerted by the pressure rolls 8 and 9, serve to pull the strip through the folding chute 6. In fact, the feeding movement of the strip is essential to produce the desired folding action of the chute 6.

The folded strip next passes through a rotary cutting mechanism which comprises a bed roll 26, mounted on a shaft 27 which is supported in fixed bearings, and a rotary cutter that is carried by an upper roll 28. This roll is cut away, as best shown in Fig. 3, to receive cutters or knives 29—29, each knife being secured to the roll by screws and backed up by adjusting screws 30. The ends of this roll are reduced and the reduced sections are supported in bearing blocks, one of which is shown at 31, Fig. 3, that are adjustable vertically. That is, both blocks are mounted in vertical slots formed in the frame of the machine, and they are held down by screws 32 which are threaded through cap blocks in the frame and carry hand wheels 33 at their upper ends to facilitate the turning of the screws. Preferably the cutter roll 28 is so adjusted that the knives 29—29 do not completely sever the folded strip S, but almost cut through it, leaving only a very weak union connecting the severed portions. This result may be readily accomplished by the proper adjustment of the cutter roll 28 with reference to the bed roll 26.

The driving connections for the cutting and feeding mechanisms comprise a sprocket and chain drive 35 between the driven roll 9, previously referred to, and the bed roll shaft 27. A gear connection is provided between the cutter rolls 26 and 28, and an intermediate gear 36, which is driven by a gear 37 fast on the cutter roll 28, drives a gear 38 which is secured on the shaft 22 of the upper feed roll 20. The feeding and cutting mechanisms are thus positively connected together. It will be observed that by changing the ratio of the drive between the cutter rolls and the feed rolls, the length of the strap sections partially severed from the strip may be varied. This may be effected by changing the gear 38. The intermediate or idler gear 36 is supported on an adjustable bracket 40 so that its position may be changed as required to mesh with the substitute gear.

After the strip has been scored or partially severed by the cutting mechanism, it passes between two guide rolls 41—41 (Figs. 2 and 3) to a winding mechanism which winds it up into a coil or roll. This mechanism comprises a shaft 42 mounted in a bracket 43 and carrying a pulley 44 at one end and a disc 45 near its opposite end. The pulley is connected by a crossed belt 46 to another pulley 47 carried by the bed roll shaft 27. Usually the strip S is wound on a small wooden or cardboard core and this core is removably held against the face of the disc 45 by means of a metal disc 48 (Figs. 1 and 2) backed up by a spring 49 which, in turn, is backed up by a collar 50 that is clamped to the shaft by a thumb screw 51. The core thus is frictionally secured to the shaft 42 and either rotates with it or slips with reference to it, depending upon the degree to which its rotation is resisted. At the same time, the driving belt for the shaft 44 can slip if too much resistance is offered to its rotation. The belt is normally held tight, however, by a spring 52 which pulls the bracket 43 backwardly, this bracket being pivoted to the machine base at 53.

It will be evident that when the winding of a coil or roll of the scored tape is started on the wooden or fibre board core, it will be necessary to rotate the shaft 42 more rapidly in order to take up the tape as fast as it comes from the cutting mechanism than it will be later when a roll of considerable diameter has been built up. The driving arrangement above described permits the desired variation in speed, either the core slipping on the shaft 42, or the belt 46 slipping on its pulleys, or both, depending upon the degree of friction exerted.

It will now be understood that in using the machine, a roll R (Fig. 2) of strap stock is placed on the stand 2 and the strip of stock unwound from the roll is threaded through the machine following the path above described. Power is then thrown on the machine and the feeding movement of the strip is started. This feeding movement is utilized to fold the strip upon itself, as above described, as the strip travels through the chute 6. The paper covering is stripped from the fabric as the latter passes around the blade 5. The folded strip next travels through the pressure rolls, feed rolls and cutting mechanism and is then wound up, these operations being performed continuously until the supply of material in the roll R is exhausted. All these operations take place automatically, the operator or machine attendant being required simply to place the supply rolls R in the proper position, thread the strip through the machine and take off the finished rolls from the winding mechanism.

An important advantage of the folded and scored strip made in this manner is that the individual straps can be readily torn off from the strip, the scoring or cutting being so deep that a very weak connection only holds the straps together. This strap strip is more convenient for the rubber shoe makers to use than are the separated straps. At the same time, this method is more economical than have been the processes of making straps heretofore practised. It for any reason, it should be desired to completely sever the strip as it passes through the cutting mechanism, this can very easily be done by properly adjusting the cutter roll 28 with reference to the bed roll 26.

While the machine above described represents the best embodiment of our invention that we have so far devised, it is contemplated that the invention may be embodied in other forms without departing from the spirit or scope thereof.

Having thus described our invention, what we desire to claim as new is:

1. In a machine for making straps, the combination of means for feeding a strip of strap stock, and means for cutting nearly through said strip transversely thereof at intervals while the feeding movement is continued uninterruptedly.

2. In a machine for making straps, the combination of means for feeding a strip of strap stock, a roll over which said strip is fed, and a revolving cutter cooperating with said roll to partially cut through said strip at intervals to partially divide it into individual straps while leaving said strips connected by a weak union.

3. In a machine for making straps, the combination of means for feeding a strip of strap stock, means for cutting nearly through said strip transversely thereof at intervals whereby the strip is partially severed into individual straps, and mechanism for winding said partially severed strip, both said winding and cutting operations being performed while the feeding movement of the strip continues uninterruptedly.

4. In a machine for making straps, the combination of means for feeding a strip of strap stock, means for cutting nearly through said strip transversely thereof at intervals whereby said strip is partially severed into individual straps, mechanism for winding said partially severed strip, positive driving connections between said feeding and cutting mechanisms and friction driving connections between said cutting and winding mechanisms, whereby the cutting and winding operations will be performed without interrupting the feeding movement of the strip.

5. In a machine for making straps, the combination of means for folding a strip of sheet strap stock upon itself, mechanism for cutting nearly through said folded strip at intervals to partially divide the strip into the desired lengths for individual straps, and power driven means for feeding said strip through said cutting mechanism and said folding means.

6. In a machine for making straps, the combination of means for folding a strip of sheet strap stock upon itself, feed rolls for engaging said folded strip and feeding it through said folding means, a rotary cutting mechanism for partially cutting said folded strip into the desired lengths while said feeding movement continues uninterruptedly, and positive driving connections between said feeding and cutting mechanisms.

7. In a machine for making straps, the combination of means for folding a strip of sheet strap stock upon itself, mechanism for cutting nearly through said folded strip at intervals to partially divide the strip into the desired lengths for individual straps, and power driven means for feeding said strip through said cutting mechanism and said folding means, a pressure roll acting on said strip to press the folds together at a point between the folding means and said feed rolls, and a winding mechanism for winding up the partially severed strip as it issues from the cutting mechanism.

8. In a machine for making straps, the combination of means for folding a strip of sheet strap stock upon itself, mechanism for cutting said folded strip at intervals, power driven means for feeding said strip through said cutting mechanism and said folding means, and means for winding up said strip substantially as fast as it issues from the cutting mechanism.

In testimony whereof we have hereunto signed our names to this specification.

ERNEST W. DUNBAR.
EDMUND J. DEMPSEY.